United States Patent
Wallman et al.

(10) Patent No.: US 7,497,508 B2
(45) Date of Patent: Mar. 3, 2009

(54) BONNET FOR A VEHICLE

(75) Inventors: Mattias Wallman, Varberg (SE); Lennart Olsson, Lerum (SE); Anders Fredriksson, Göteborg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 165 days.

(21) Appl. No.: 11/731,958

(22) Filed: Apr. 2, 2007

(65) Prior Publication Data
US 2007/0235237 A1 Oct. 11, 2007

(30) Foreign Application Priority Data
Apr. 4, 2006 (EP) .................................. 06112207

(51) Int. Cl.
*B60R 21/34* (2006.01)
*B62D 25/10* (2006.01)
*E05B 65/19* (2006.01)

(52) U.S. Cl. ........................ 296/193.11; 292/DIG. 14; 296/187.04

(58) Field of Classification Search .......... 180/DIG. 14, 180/69.2, 69.21; 292/DIG. 14; 296/187.04, 296/193.11
See application file for complete search history.

(56) References Cited

U.S. PATENT DOCUMENTS

| | | | | |
|---|---|---|---|---|
| 1,815,540 | A * | 7/1931 | Black et al. ............... | 180/69.2 |
| 2,126,141 | A * | 8/1938 | Saunders .................... | 292/223 |
| 2,697,625 | A * | 12/1954 | Krause ........................ | 292/64 |
| 2,776,160 | A * | 1/1957 | Krause ........................ | 292/304 |
| 2,779,615 | A * | 1/1957 | Kaiser ........................ | 292/221 |
| 2,865,668 | A * | 12/1958 | Krause ........................ | 292/216 |
| 5,197,560 | A * | 3/1993 | Oda et al. ................. | 180/69.21 |
| 5,385,212 | A | 1/1995 | Cady et al. ............... | 180/69.21 |
| 5,437,348 | A * | 8/1995 | Cady et al. ............... | 180/69.21 |
| 5,697,467 | A * | 12/1997 | Howard .................... | 180/69.21 |
| 5,833,024 | A * | 11/1998 | Kaneko ..................... | 180/69.2 |
| 6,641,209 | B2 * | 11/2003 | Warwel et al. ......... | 296/187.07 |
| 7,232,178 | B2 * | 6/2007 | Neal et al. ............. | 296/187.04 |
| 2005/0082874 | A1 * | 4/2005 | Ikeda et al. ............ | 296/193.11 |
| 2006/0028051 | A1 * | 2/2006 | Brei et al. .............. | 296/187.04 |

FOREIGN PATENT DOCUMENTS

| | | | |
|---|---|---|---|
| EP | 509690 A1 | * | 10/1992 |
| EP | 630801 A1 | * | 12/1994 |
| EP | 1557340 A1 | * | 7/2005 |
| EP | 1842746 A1 | * | 10/2007 |
| FR | 2836879 A1 | * | 9/2003 |
| JP | 59006174 A | * | 1/1984 |
| JP | 60259526 A | * | 12/1985 |
| JP | 2004148886 A | * | 5/2004 |
| JP | 2005343279 A | * | 12/2005 |

* cited by examiner

*Primary Examiner*—Glenn Dayoan
*Assistant Examiner*—Paul A Chenevert
(74) *Attorney, Agent, or Firm*—Gregory Brown; Miller Law Group, PLLC

(57) ABSTRACT

A bonnet for an automotive vehicle has a leading end, a trailing end, and a lock striker for locking the free end of the bonnet to the vehicle body during normal operation when the bonnet is closed. The lock striker is spaced from the bonnet portion by a mounting mechanism that includes at least one elongated arm extending between the inside of the bonnet portion and the lock striker. At least one portion of the elongated arm is weakened to permit relative pivoting of the bonnet portion and the lock striker around a geometrical axis when the elongated arm is loaded in excess of a predetermined value. The bonnet is thus allowed to move downwardly in the event of an impact between a pedestrian and the bonnet portion.

17 Claims, 3 Drawing Sheets

BONNET FOR A VEHICLE

FIELD OF THE INVENTION

The invention relates to a bonnet for the front end of an automotive vehicle, and, more particularly, to a mechanism connected to the bonnet that allows the bonnet to move downwardly when incurring an impact.

BACKGROUND OF THE INVENTION

Motor vehicle manufacturers are constantly striving to provide vehicles which, in the event of a collision, reduce the risk of injury to persons involved in the collision. These persons may be occupants of the vehicle or a pedestrian which is struck by the vehicle. To this end, vehicles are nowadays designed with so-called deformation zones which deform in a controlled manner to thereby absorb energy which arises during impact between the vehicle and an object. The amount of energy which arises in a collision is proportional to the square of the relative velocity between the vehicle and the object at impact. Accordingly, the risk of injury to occupants of vehicles is increased at higher speeds. Due to the considerable amounts of energy which arise as a result of high speed collisions, the deformation zones must exhibit a certain degree of stiffness, or resistance to deformation, to function effectively at those high speeds.

Most collisions between vehicles and pedestrians occur in built-up or urban areas in which the speed of the vehicles is relatively low. For example, most jurisdictions impose a speed limit in urban areas of about 50 km/h. In most collisions, the speed of the vehicle is lower than 40 km/h. Due to the relatively light weight of most pedestrians, the amount of energy arising from a low speed collision between a vehicle and a pedestrian is relatively low. In such situations, the deformation zones of the vehicle may not deform to any great extent and, therefore, a large amount of the energy is transmitted to the pedestrian, possibly resulting in injury.

In addition, a vehicle has certain critical positions that are involved during a collision between a pedestrian and a vehicle. During such a collision between a vehicle and a pedestrian, the pedestrian typically initially impacts the front of the vehicle and, thereafter, the bonnet of the vehicle. Although the bonnet itself may be designed to be relatively deformable, the engine covered by the bonnet is normally not deformable. As a result, the deformation capability of the bonnet is dependent on the size of the clearance between the bonnet and the engine. Several attempts have been made to reduce the head injuries of a pedestrian by certain configurations of the vehicle bonnet, including different configuration that cause the trailing edge of the bonnet to lift. For example, U. S. Pat. No. 5,385,212, granted on Jan. 31, 1995, to John Cady, et al., discloses a vehicle bonnet for motor cars where the vehicle bonnet is lifted to provide a clearance, so that the bonnet may deform to cushion the impact. Such a clearance can be obtained by arranging the bonnet assembly to move rearwardly and pivot when an impact is applied to the leading edge of the bonnet. Such a bonnet is, however, not able to effectively protect a pedestrian in all kind of impact situations. In particular, in a collision between a child and a vehicle the head of the child hits the bonnet at a position much closer to the leading edge of the bonnet.

SUMMARY OF THE INVENTION

A vehicle is usually provided with a bonnet having a lock striker for locking the bonnet when the bonnet is closed. In case the hinge mechanism of the bonnet is arranged in the trailing end of the bonnet close to the windscreen of the vehicle, the lock striker will often be arranged in a position close to the leading edge of the bonnet. The lock striker which can be arranged on the inner bonnet to cooperate with a locking mechanism of the vehicle body has normally a relatively high resistance to deformation because of the required rigidity to enable the mechanism to perform the intended function thereof. Furthermore, when the lock striker is engaged with such a locking mechanism of the vehicle body, the possibility of displacing the lock striker in the vertical direction is very limited. Accordingly, the deformation capability of the bonnet is strongly reduced in the area close to the lock striker. In most cases the mass-moment of inertia of the bonnet, and the force exerted by any other component supporting the bonnet, creates a sufficient resistance against movement of the bonnet to cushion the impact. Any additional resistance against movement or resistance to deformation caused by the lock striker could increase the risk of injury to the pedestrian.

The invention is based on the insight that the bonnet area close to a lock striker is potentially dangerous to a pedestrian being hit by a vehicle, in particular to a child since the head of the child can impact the region of the bonnet where the lock striker is arranged.

It is an object of this invention to provide a bonnet for an automotive vehicle that will reduce to a substantial extent the risk of injury to a pedestrian during an impact between the pedestrian and a vehicle.

It is a feature of this invention that the lock striker is arranged in a spaced apart relationship from the bonnet by means of at least one elongated arm extending between the inside of the bonnet and the lock striker.

It is another feature of this invention that the elongated arm incorporates a weakening portion arranged to permit a relative pivoting of the bonnet portion and the lock striker around a geometrical axis upon impact.

It is an advantage of this invention that the elongated arm moves downwardly when the elongated arm is loaded in excess of a predetermined value.

It is another advantage of this invention that the bonnet portion reduces the risk of injury to a pedestrian when impacted by the vehicle.

By the provision of a bonnet having a lock striker which is arranged spaced apart from the bonnet portion by means of an elongated arm, where at least one portion of the elongated arm constitutes a weakening of said arm, which weakening portion is arranged to permit relative pivoting of the bonnet portion and the lock striker around a geometrical axis when the elongated arm is loaded in excess of a predetermined value, the bonnet portion can move downwardly during an impact while the resistance against movement caused by the lock striker and a locking mechanism is reduced. The bonnet portion can be displaced in the vertical direction relative to the lock striker and the locking mechanism.

A bonnet according to the invention can be used for achieving a pedestrian protection in an accident between a vehicle and a pedestrian. In particular, possibly head injuries of a child caused by a collision can be reduced.

According to a preferred embodiment of the invention, the lock striker is supported by a first elongated arm and a second elongated arm, wherein the first and second arms are interconnected to the bonnet portion at a first position and a second position, respectively, and the first and second positions are spaced apart from each other in the longitudinal direction of the bonnet portion. Hereby, the lock striker is firmly supported during normal conditions, and the arms are able to yield during impact.

To obtain even more favorable impact characteristics, weakening portions are preferably situated at connections between the first elongated arm and the bonnet portion, and between the first elongated arm and the lock striker, and between the second elongated arm and the bonnet portion, and between the second elongated arm and the lock striker.

It is yet another object of this invention to provide a bonnet for an automotive vehicle having a lock striker that can yield during impact and which is durable in construction, inexpensive of manufacture, carefree of maintenance, facile in assemblage, and simple and effective in use.

These and other objects, features and advantages are accomplished according to the instant invention by providing a bonnet for an automotive vehicle having a leading end, a trailing end, and a lock striker for locking the free end of the bonnet to the vehicle body during normal operation when the bonnet is closed. The lock striker is spaced from the bonnet portion by a mounting mechanism that includes at least one elongated arm extending between the inside of the bonnet portion and the lock striker. At least one portion of the elongated arm is weakened to permit relative pivoting of the bonnet portion and the lock striker around a geometrical axis when the elongated arm is loaded in excess of a predetermined value. The bonnet is thus allowed to move downwardly in the event of an impact between a pedestrian and the bonnet portion.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
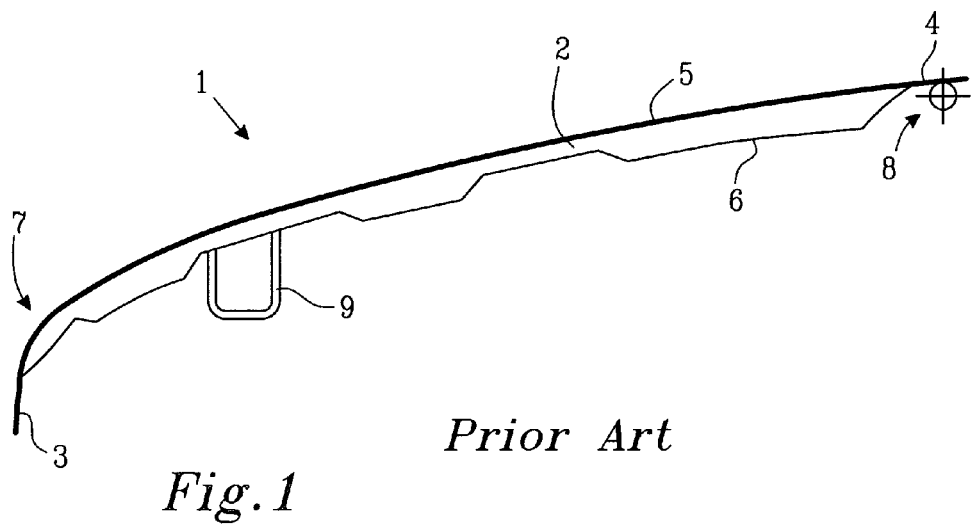
FIG. 1 is a schematic cross-sectional view illustrating a vehicle bonnet configured in a manner known in the prior art.

In FIG. 1, a vehicle bonnet 1 configured according to known prior art principles is illustrated. The bonnet 1, often referred to as an engine hood, is intended to be arranged on an automotive vehicle to cover an engine compartment of the vehicle. The bonnet 1 has a bonnet portion 2 provided with a leading edge 3 and a trailing edge 4. The bonnet portion 2 is made up by an outer bonnet portion sheet 5 and an inner bonnet portion sheet 6. The bonnet 1 is orientated such that the leading end 7 of the bonnet is located to the left and the trailing end 8 is located to the right in FIG. 1. The bonnet 1 is positioned in a locked position corresponding to normal operation of the vehicle when the bonnet is attached to a vehicle and the bonnet is closed. The bonnet 1 is further provided with a lock striker 9 arranged on the inside of the bonnet portion 2 close to the leading end 7 of the bonnet portion 2 for locking the free leading end 7 of the bonnet portion 2 to a vehicle body. Usually the lock striker 9 is arranged directly on the inside of the inner sheet 6 of the bonnet portion 2 for engagement with a conventional locking mechanism (not illustrated) mounted on the vehicle body in the closed state of the bonnet 1. At the trailing end 8 of the bonnet portion 2, a hinge mechanism is suitable arranged so as to enable the bonnet to be opened relative to the engine compartment for access to the engine (not shown) by pivoting the bonnet portion 2 about the hinge mechanism.

Figure 2:
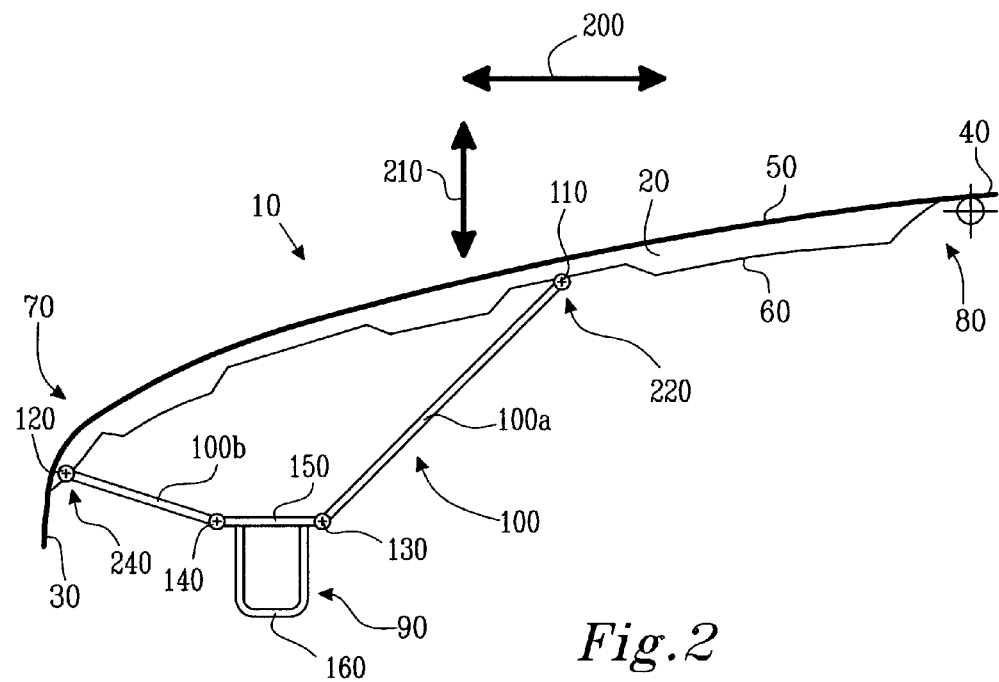
FIG. 2 is a schematic cross-sectional view depicting a side elevational view of a vehicle bonnet according to the instant invention.
Figure 3:
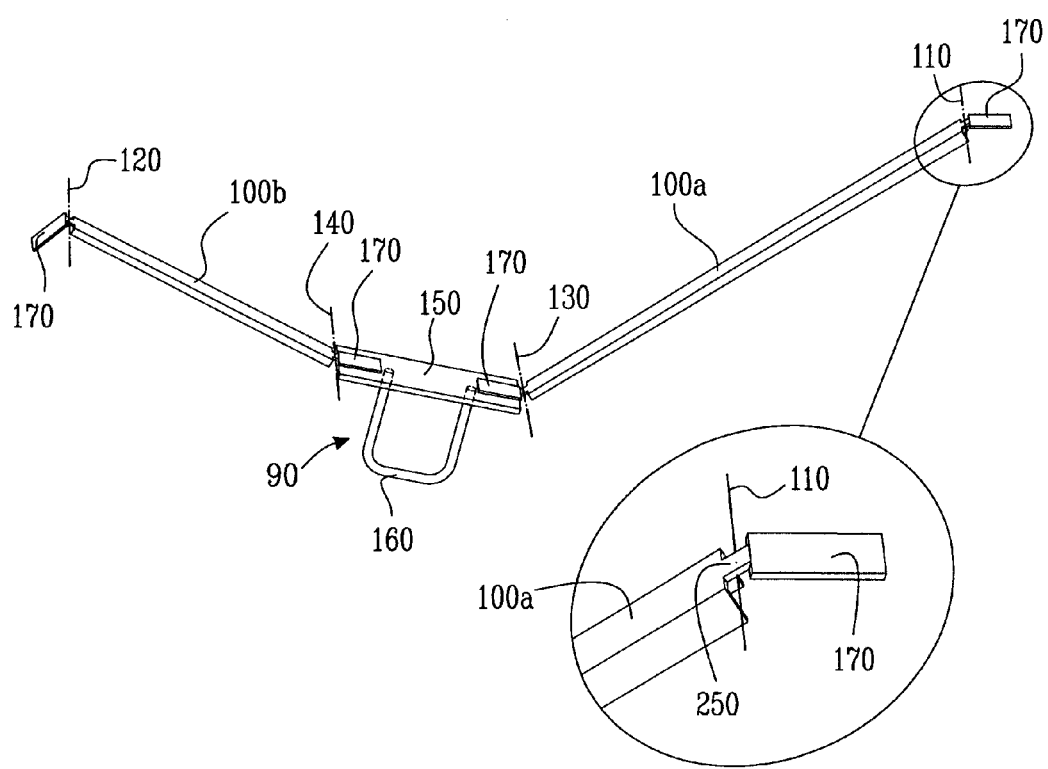
FIG. 3 is an enlarged schematic elevational view of two elongated arms of the bonnet illustrated in FIG. 2, and an enlarged illustration of a weakening portion intended to provide a pivot axis during impact.
Figure 4:
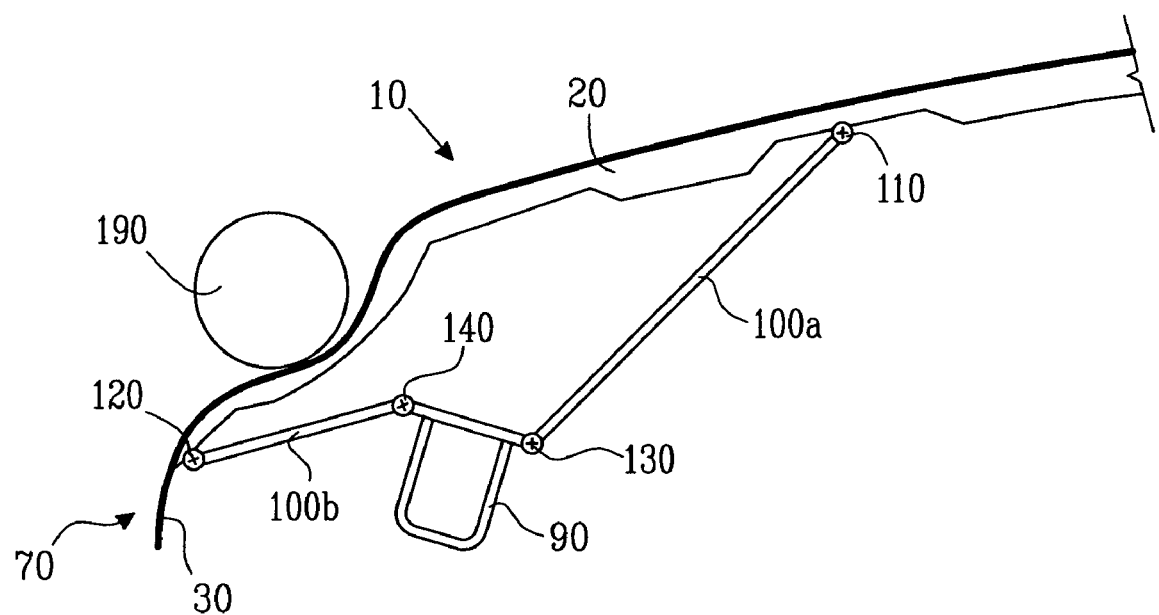
FIG. 4 is a schematic cross-sectional view depicting an impact between an object and the bonnet and showing the deformation of the bonnet according to the principles of the instant invention.

A vehicle bonnet 10 incorporating the principles of the instant invention is best seen in FIGS. 2-4. In FIG. 1, the bonnet 10 is schematically illustrated in a closed or locked position corresponding to the position of the prior art bonnet in FIG. 1. The bonnet 10 comprises a bonnet portion 20 having a leading edge 30 and a trailing edge 40, and a lock striker 90 for locking the free end 70 of the bonnet portion 20 to a vehicle body during normal operation when the bonnet 10 is closed. The lock striker 90 is arranged in a spaced apart relationship with respect to the bonnet portion 20 by at least one elongated arm 100 extending between the bonnet portion 20 and the lock striker 90. The distance between the bonnet portion 20 and the lock striker 90 can be varied to give different impact characteristics. The length of the elongated arm 100 can affect the resistance against displacement of the bonnet and determine the maximum displacement motion to the bonnet allowed by the lock striker 90. The elongated arm 100 can have an extension in the vertical direction 210 that is in the interval 50-150 mm, preferably 60-100 mm. Accordingly, the space between an inner bonnet portion sheet 60 of the bonnet portion 20 and the lock striker 90 is several times, preferably 5-10 times, the distance between the inner bonnet portion sheet 60 and an outer bonnet portion sheet 50. Usually, the distance between the inner bonnet portion sheet 60 and the outer bonnet portion sheet is in the interval 10-20 mm.

At least one portion 250 (see FIG. 3) of the elongated arm 100 constitutes a weakening of the elongated arm 100 which will permit relative pivoting of the bonnet portion 20 and the lock striker 90 around a geometrical pivot axis 110 when the arm 100 is loaded in excess of a predetermined value so as to allow the bonnet portion 20 to move downwardly in case of an impact between an object, such as a pedestrian, and the bonnet.

Normally, an impact between the head of a pedestrian and the bonnet implies that a force having a vertical component is transmitted to the bonnet portion. The predetermined load value can be selected, and the desired impact characteristics can be obtained by predetermination of a maximal vertical force allowed during impact so as to avoid head injuries of the pedestrian to an extent as great as possible.

The type, position and size of the weakening of the elongated arm 100 determines the critical load required to obtain pivot motion around the geometrical pivot axis 110, and thus the resistance against displacement of the bonnet 10 is determined by the stiffness of the weakening portion. The weakening portion 250 may be obtained by arranging a notch such as a slit, an incipient crack, a hack, a fold or flopper, and/or a material defect in the elongated arm 100. Thus, the size, geometry and/or the material properties of the elongated arm 100 can be used to achieve the requisite impact characteristics. The elongated arm 100 has preferably a reduced cross section area at the weakening portion in comparison to the remaining part of the elongated arm 100.

Also embodiments where an additional component has to be broken to permit pivot motion around the geometrical pivot axis can be used. In this case, the weakening portion can be a regular pivot axis achieved by a hinge mechanism or similar apparatus in which the pivot mechanism is locked against pivot motion by the additional component during normal conditions. By the provision of such an additional component, such as a shear pin or similar, a non-ambiguously defined threshold load needed to cause the pivot motion can be achieved.

Of course the current part of the elongated arm 100 comprising the weakening portion could be a portion of the bonnet portion 20 or the lock striker 90 if the portion is connected to the elongated arm 100 and thus constitutes an extension thereof.

The bonnet portion 20 can comprise an outer bonnet portion sheet 50 and an inner bonnet portion sheet 60 in a conventional way, although other structures of the bonnet portion 20 are also possible when applying the invention. Although not critical to the invention, the lock striker 90 can comprise for example a plate 150 onto which a loop 160 is attached. The loop 160 is then intended to engage with a conventional lock mechanism (not illustrated) of the vehicle body in the closed state of the bonnet 10.

The lock striker is arranged spaced apart from the bonnet portion to create a space between the bonnet portion and the lock striker which enables the bonnet portion to deform without impacting or striking the lock striker. The elongated arm/arms can be achieved by means of additional components such as rods, beams or similar, arranged on the inside of the bonnet portion. It is also possible to design the inner bonnet portion sheet so as to form the elongated arm/arms, in which case the distance between the outer bonnet portion sheet and the inner bonnet portion sheet in an area around the position of the lock striker is much greater in comparison with the remaining part of the bonnet portion. The area of the bonnet portion where the distance between the bonnet portion sheets are spaced apart from each other to create the space and the elongated arm/arms is smaller than 10%, preferably smaller than 5% of the total bonnet portion area. Using the inner bonnet portion sheet in this way makes it possible to obtain the requisite weakening portion/portions during punching the inner bonnet portion sheet.

In the embodiment illustrated in FIG. 2, the lock striker 90 is supported by two elongated arms 100*a*, 100*b*. The lock striker 90 is supported by the first elongated arm 100*a* and the second elongated arm 100*b*. The first and second arms are interconnected to the bonnet portion 20 at a first position 220 and a second position 240, respectively, and the first and second positions are spaced apart from one other. These first and second positions 220, 240 are preferably spaced apart from each other in the longitudinal direction 200 of the bonnet portion 20 between the leading end 70 and the trailing end 80. The arms 100*a*, 100*b* are preferably interconnected to the bonnet portion 20 as far forward as possible; that is to say close to leading edge 30. The positions 220, 240 are suitably situated on a geometrical plane defined by the longitudinal direction 200 of the bonnet portion 20 and a vertical direction 210. In other words, the first position 220 and the second position 240 are preferably spaced apart from each other in the fore-and-aft direction of a vehicle when the bonnet 10 is installed for use in the vehicle. The distance in the horizontal direction 200 between the first and second positions 220, 240 is preferably 3-5 times the arm extension in the vertical direction 210. The horizontal distance may be in the interval 150-500 mm.

Furthermore, laterally the lock striker 90 and the first and second attachment positions 220, 240 are preferably arranged adjacent to the longitudinal centre line of the bonnet. If two sets of lock strikers are used, these are suitably arranged to be laterally spaced relative to each other by one third of the width of the bonnet and equally displaced relative to the longitudinal center line of the bonnet 10.

Furthermore, in the embodiment illustrated in FIG. 2, four said weakening portions providing corresponding geometrical axes 110, 120, 130, 140 are preferably situated at connections between the first elongated and 100*a* and the bonnet portion 20, and between the second elongated arm 100*b* and the bonnet portion 20, and between the first elongated arm 100*a* and the lock striker 90, and between the second elongated arm 100*b* and the lock striker 90, respectively. Thereby, relative pivoting of the first elongated arm 100*a* and the bonnet portion 20 and of the first elongated arm 100*a* and the lock striker 90 is permitted. In the same way, relative pivoting of the second elongated arm 100*b* and the bonnet portion 20 and of the second elongated arm 100*b* and the lock striker 90 is permitted as well.

The front arm, i.e. the second elongated arm 100*b* in FIG. 2, has preferably an orientation before impact such that the arm forms an angle relative to the horizontal direction 200 in the interval from zero up to 45°. In FIG. 2, the angle between the second elongated arm 100*b* and the horizontal direction 200 is approximately 30°. An arm which is too uprightly arranged corresponding to for example an angle exceeding 60° and close to 90° could during certain conditions affect the pivot characteristics of the arm 100*b* negatively.

In one embodiment of the invention the elongated arms 100*a*, 100*b* and the lock striker 90 in FIG. 2 can be designed as illustrated in FIG. 3. FIG. 3 is an elevational view of the first and second elongated arms 100*a*, 100*b*, and an enlarged illustration of a weakening portion 250 of the first elongated arm 100*a*. The weakening portion 250 is intended to provide the pivot axis 110 for relative pivoting of the bonnet portion 20 and the first elongated arm 100*a*. The elongated arms can for example be produced from U-beams of steel or aluminium alloys. At the ends of the elongated arms 100*a*, 100*b*, there are attachment plates 170 for attachment of the respective ends of the arms 100*a*, 100*b* to the bonnet portion 20 and to the plate 150 of the lock striker 90. The attachment plates 170 can be welded or soldered to the bonnet portion 20 and/or the lock striker 90, or any screw or bolt connection or similar attachment means can be used. The weakening portion 250 is achieved by giving the first elongated arm 100*a* a reduced cross section area in the current portion which will result in a lower stiffness against bending. This weakening portion is situated between the attachment plate 170 and the remaining part of the elongated arm 100*a*. The other weakening portions at the ends of the elongated arms 100*a*, 100*b* are similarly configured.

FIG. 4 illustrates an impact between an object 190, such as a simulated child head, and the bonnet according to the invention. During impact and deformation of the bonnet portion 20, the weakening portions providing the geometrical pivot axes 110, 120, 130, 140 of the elongated arms enable pivoting of the bonnet portion 20 and the lock striker 90 relative to each other. Even if the possibility to displace the lock striker in the vertical direction usually is very limited, the lock striker may sometimes be pivotable relative to the locking mechanism arranged on the vehicle, and this can also contribute to the impact characteristics of the bonnet 10. However, also in a case where the lock striker 90 is fixedly arranged against displacement as well as pivot motion relative to the locking mechanism, the bonnet portion 20 and the lock striker 90 can pivot relative to each other during displacement and deformation of the bonnet portion 20.

Although FIG. 4 illustrates an impact close to the leading edge 30 of the bonnet portion, the bonnet according to the invention has advantages also in case of an impact in the middle or rear part of the bonnet portion 20.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. In a bonnet for a vehicle, said bonnet including an inside bonnet portion having a leading end and a trailing end, and a lock striker for locking one of said leading and trailing ends of the bonnet to a vehicle body during normal operation when the bonnet is closed, the improvement comprising:

said lock striker being arranged in a spaced apart relationship with respect to said inside bonnet portion by at least one elongated arm in an elongated direction extending between the inside bonnet portion and the lock striker, at least one portion of the elongated arm having a weakening point arranged to permit relative pivoting of the bonnet portion and the lock striker around a geometrical axis when the elongated arm is loaded in excess of a predetermined value, whereby said bonnet is allowed to move downwardly upon impact with an object, and wherein the elongated arm is provided with a notch at said weakening point.

2. The bonnet of claim 1 wherein the elongated arm has reduced cross sectional area at said weakening point.

3. The bonnet of claim 1 wherein said geometrical axis is arranged substantially horizontally and substantially perpendicularly to a longitudinal direction of the bonnet portion extending between said leading end and said trailing end.

4. The bonnet of claim 1 wherein said weakening point is situated at a connection between the elongated arm and the inside bonnet portion, thereby permitting relative pivoting of the elongated arm and the bonnet portion.

5. The bonnet of claim 1 wherein said weakening point is situated at a connection between the elongated arm and the lock striker, thereby permitting relative pivoting of the elongated arm and the lock striker.

6. The bonnet of claim 1 wherein said lock striker is supported by first and second elongated arms connected to the inside bonnet portion at a first position and a second position, respectively, said first and second positions being longitudinally spaced and located between said leading end and said trailing end of said inside bonnet portion.

7. The bonnet of claim 6 wherein each of said first and second elongated arms include a pair of weakening points, one of said weakening points being located at a connection between the respective said elongated arm and said inside bonnet portion, and the other said weakening point being located at the connection between the respective said elongated arm and the lock striker.

8. The bonnet of claim 7 wherein each said elongated arm further includes an attachment plate at each respective end thereof for connection thereof to said inside bonnet portion and said lock striker, respectively.

9. The bonnet of claim 8 wherein said weakening points are located between each respective said attachment plate and the corresponding end of the elongated arm.

10. A lock striker assembly for a hood on an automotive vehicle, said hood having an inside portion extending between a leading end and a trailing end defining a longitudinal orientation of said hood, comprising:

a lock striker member;

a first elongated member elongated in said longitudinal orientation and interconnecting said lock striker member with a first position on said inside portion;

a second elongated member elongated in said longitudinal orientation and interconnecting said lock striker with a second position on said inside portion, said second position being longitudinally spaced from said first position; and a weakening point permitting relative pivoting of the hood and the lock striker member around a geometrical axis upon impact of said hood with an object, and wherein each of said first and second elongated members is formed with at least one of said weakening points.

11. The lock striker assembly of claim 10 wherein each said elongated member includes an attachment plate at each respective end thereof for connection of the respective said elongated member with said inside portion and with said lock striker member.

12. The lock striker assembly of claim 11 wherein each said elongated member includes a weakening point between said elongated member and each corresponding said attachment plate.

13. The lock striker assembly of claim 12 wherein each said weakening point is formed as a reduced cross-sectional area compared to adjacent structure of said attachment plate and the corresponding elongated member.

14. The lock striker assembly of claim 12 wherein said elongated members locate said lock striker member at a vertically spaced position with respect to said inside portion of said hood.

15. A hood assembly for an automotive vehicle comprising:

a bonnet having an inside bonnet portion extending between a free leading end and a pivoted trailing end; and a lock striker mounted proximate to said leading end of said bonnet and being spaced vertically below said inside bonnet portion by first and second elongated arms extending in an elongated direction defined between said leading end and said trailing end, said elongated arms interconnecting said lock striker, and corresponding first and second positions, respectively, on said inside bonnet portion, wherein said first and second positions are spaced apart in the elongated direction, and wherein each said elongated arm including a weakening point permitting a bending of said elongated arms relative to said lock striker and allow a deformation of said bonnet relative to said lock striker upon impact of said bonnet with an object.

16. The hood assembly of claim 15 wherein each said elongated arm includes an attachment plate at each opposing end thereof for connection of the respective said elongated arm to said inside bonnet portion and to said lock striker, each said elongated member including a weakening point between said elongated arm and each corresponding said attachment plate.

17. The hood assembly of claim 16 wherein each said weakening point is formed as a reduced cross-sectional area compared to adjacent structure of said attachment plate and the corresponding elongated arm.

* * * * *